United States Patent [19]

Linneweh, Jr. et al.

[11] Patent Number: 5,862,485
[45] Date of Patent: Jan. 19, 1999

[54] METHOD AND APPARATUS FOR ALLOCATING COMMUNICATION RESOURCES TO SUPPORT PRIORITY COMMUNICATIONS IN A COMMUNICATION SYSTEM

[75] Inventors: Louis H. Linneweh, Jr., Addison; Matthew A. Houghton, Buffalo Grove, both of Ill.

[73] Assignee: Motorola, Inc., Schaumburg, Ill.

[21] Appl. No.: 828,895

[22] Filed: Mar. 26, 1997

Related U.S. Application Data

[63] Continuation of Ser. No. 414,463, Mar. 31, 1995, abandoned.

[51] Int. Cl.[6] .................................................... H04Q 7/20
[52] U.S. Cl. .......................... 455/450; 455/510; 455/517
[58] Field of Search ............................. 455/422, 62, 436, 455/179.1, 450, 451, 452, 455, 510, 527, 166.2, 517, 509

[56] References Cited

U.S. PATENT DOCUMENTS

| | | | |
|---|---|---|---|
| Re. 32,789 | 11/1988 | Lynk, Jr. et al. ........................ | 455/34.1 |
| 5,095,529 | 3/1992 | Comroe et al. . | |
| 5,123,110 | 6/1992 | Grube ...................................... | 455/33.1 |
| 5,125,103 | 6/1992 | Grube et al. ........................... | 455/166.2 |
| 5,159,702 | 10/1992 | Aratake .................................. | 455/33.1 |
| 5,261,117 | 11/1993 | Olson ..................................... | 455/34.1 |
| 5,301,356 | 4/1994 | Bodin et al. ........................... | 455/33.2 |
| 5,301,359 | 4/1994 | Van Den Heuvel et al. . | |
| 5,745,853 | 4/1998 | Hippelainen ............................ | 455/450 |

FOREIGN PATENT DOCUMENTS

WO96/00482  1/1996  Finland .

*Primary Examiner*—William A. Cuchlinski, Jr.
*Assistant Examiner*—Gertrude Arthur
*Attorney, Agent, or Firm*—Heather L. Creps

[57] ABSTRACT

A communication system (100) employs a method (300) and apparatus (118) for allocating communication resources (e.g., 127–128) to support priority communications by communication units (112, 114–116) in the communication system (100). The communication system includes infrastructure equipment that allocates the communication resources to the communication units (112, 114–116). When the infrastructure equipment automatically determines (303) that a communication unit (e.g., 112) desires to initiate a priority call, the infrastructure equipment reserves (307) a communication resource (127) for the communication unit (112) at a base site (101) of the infrastructure equipment serving the communication unit (112). The serving base site (101) then allocates (309) the reserved communication resource (127) to the communication unit (112) upon the communication unit's initiation of the priority call.

18 Claims, 3 Drawing Sheets

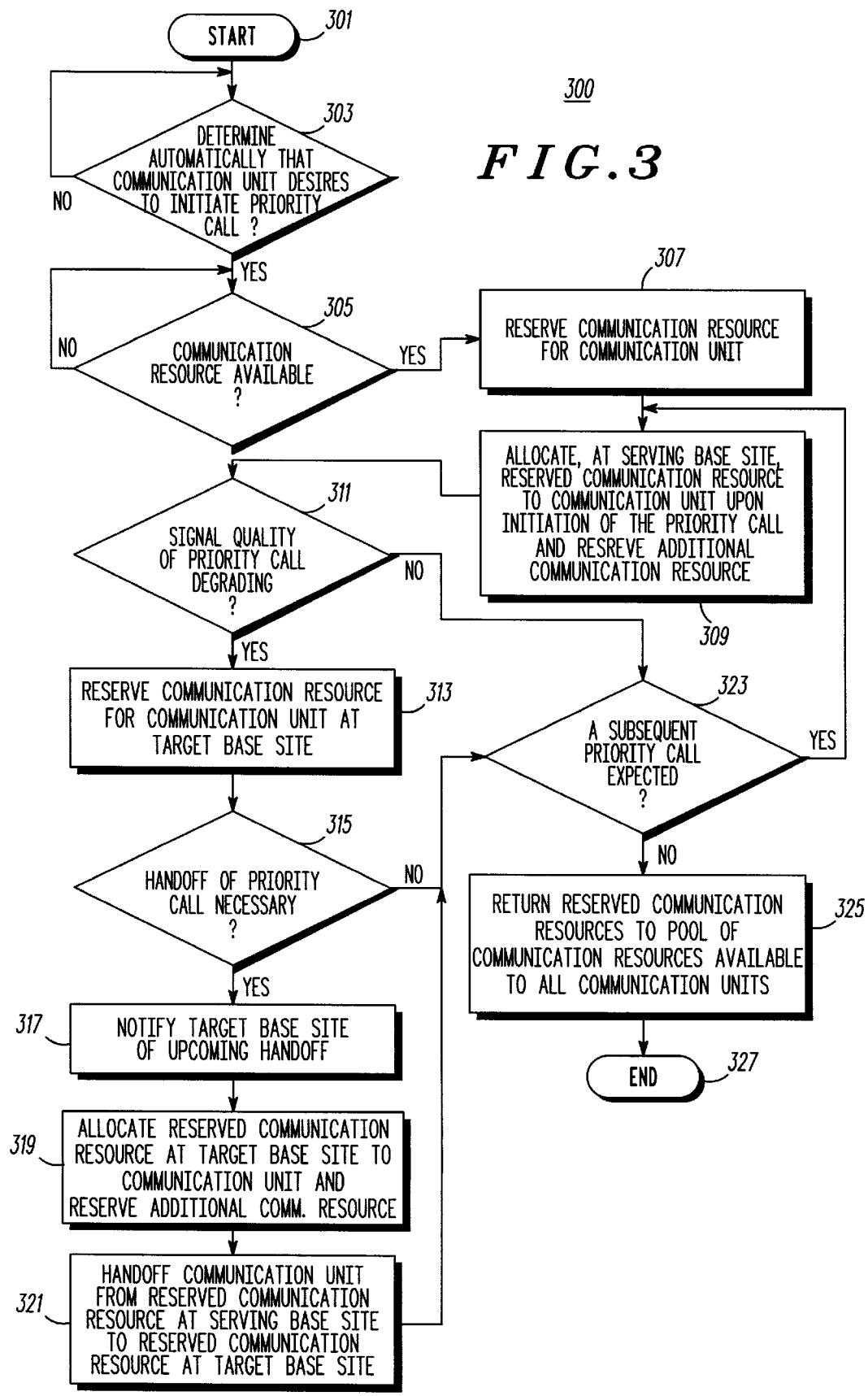

METHOD AND APPARATUS FOR ALLOCATING COMMUNICATION RESOURCES TO SUPPORT PRIORITY COMMUNICATIONS IN A COMMUNICATION SYSTEM

This application is a continuation of application Ser. No. 08/414,463, filed Mar. 31, 1995, now abandoned.

FIELD OF THE INVENTION

The present invention relates generally to communication systems and, in particular, to a method and apparatus for allocating communication resources to support priority communications by communication units in a communication system.

BACKGROUND OF THE INVENTION

Communication systems are known to comprise infrastructure equipment and a plurality of communication units. The infrastructure equipment typically includes a plurality of base sites and at least one base site controller (BSC) controlling one or more of the base sites. One such communication system is a cellular communication system. During the operation of a typical cellular communication system, communication unit users attempt to place a variety of calls. Some of the calls are emergency in nature and are referred to as priority calls. Priority calls are given priority over standard calls when communication resources, or channels, are allocated from the base sites during system operation. There are currently two methods for allocating communication resources to support priority calls in cellular communication systems. The first method is queuing and the second method is channel reservation.

With queuing, communication units placing priority calls are placed in a queue by the BSC based on their priority and remain in the queue until communication resources become available to support their calls. When a communication resource becomes available, the BSC instructs the base site serving a selected, queued communication unit to call the selected communication unit back and immediately allocate the available communication resource to the communication unit. The primary advantage of using queuing to allocate channels for priority calls is that queuing is spectrally efficient because it prevents communication resources from remaining idle while waiting for previously denied priority calls to be re-initiated. However, queuing provides an inherent delay associated with waiting for an available channel and does not provide any means for expediting the availability of channels to support the queued priority calls. Further, queuing requires the user of the communication unit to be familiar with the call-back process.

With channel reservation, one or more channels are reserved at the BSC for use by those users placing priority calls only and are, therefore, unavailable to all non-priority callers. Thus, channel reservation allows priority callers virtually immediate access to the cellular system. However, channel reservation inherently reduces the efficiency and capacity of the system when invoked.

There are currently two approaches for implementing channel reservation in cellular communication systems. The first approach is continuous channel reservation and the second approach is intermittent, or as-needed, channel reservation. In continuous channel reservation, a system operator maintains a predetermined number of reserved channels at all times for priority use only. This approach provides the least efficient use of resources by permanently reducing the number of channels available to non-priority callers. In intermittent channel reservation, a user or group of users (e.g., a fire department) anticipating the need to place priority calls contacts the cellular system operator and requests the operator to activate channel reservation of a particular number of channels throughout the system or in a particular area of the system. The operator then invokes channel reservation for the requester. Upon completion of the priority calls, the user must then contact the system operator again to request de-activation of channel reservation. Thus, intermittent channel reservation is more efficient than permanent reservation; however, it requires considerable human intervention to be activated and de-activated.

Therefore, a need exists for a method and apparatus for allocating communication resources to support priority calls in a communication system that provides for channel reservation on an as-needed basis, that eliminates human intervention in the channel reservation process, and that expedites the availability of communication resources to reduce the delay associated with queued priority calls.

BRIEF DESCRIPTION OF THE DRAWINGS

FIG. 3 illustrates a logic flow diagram of steps executed by a base site controller and a base site in accordance with a preferred embodiment of the present invention.

DESCRIPTION OF A PREFERRED EMBODIMENT

The present invention encompasses a method and apparatus for allocating communication resources to support priority communications by communication units in a communication system. The communication system includes infrastructure equipment that allocates the communication resources to the communication units. When the infrastructure equipment automatically determines that a communication unit desires to initiate a priority call, the infrastructure equipment reserves a communication resource for the communication unit at a base site of the infrastructure equipment serving the communication unit. The serving base site then allocates the reserved communication resource to the communication unit upon the communication unit's initiation of the priority call. By allocating communication resources to support priority calls in this manner, the present invention provides communication resource, or channel, reservation for the priority calls on an as-needed basis, without requiring individuals or groups of individuals (e.g., emergency service personnel) to request a system operator to activate channel reservation prior to the placing of priority calls. In addition, the present invention's automatic determination of a priority call eliminates the need for the system operator to maintain dedicated channels for priority calls, thereby permitting the system operator to more efficiently use an assigned frequency spectrum.

Figure 1:
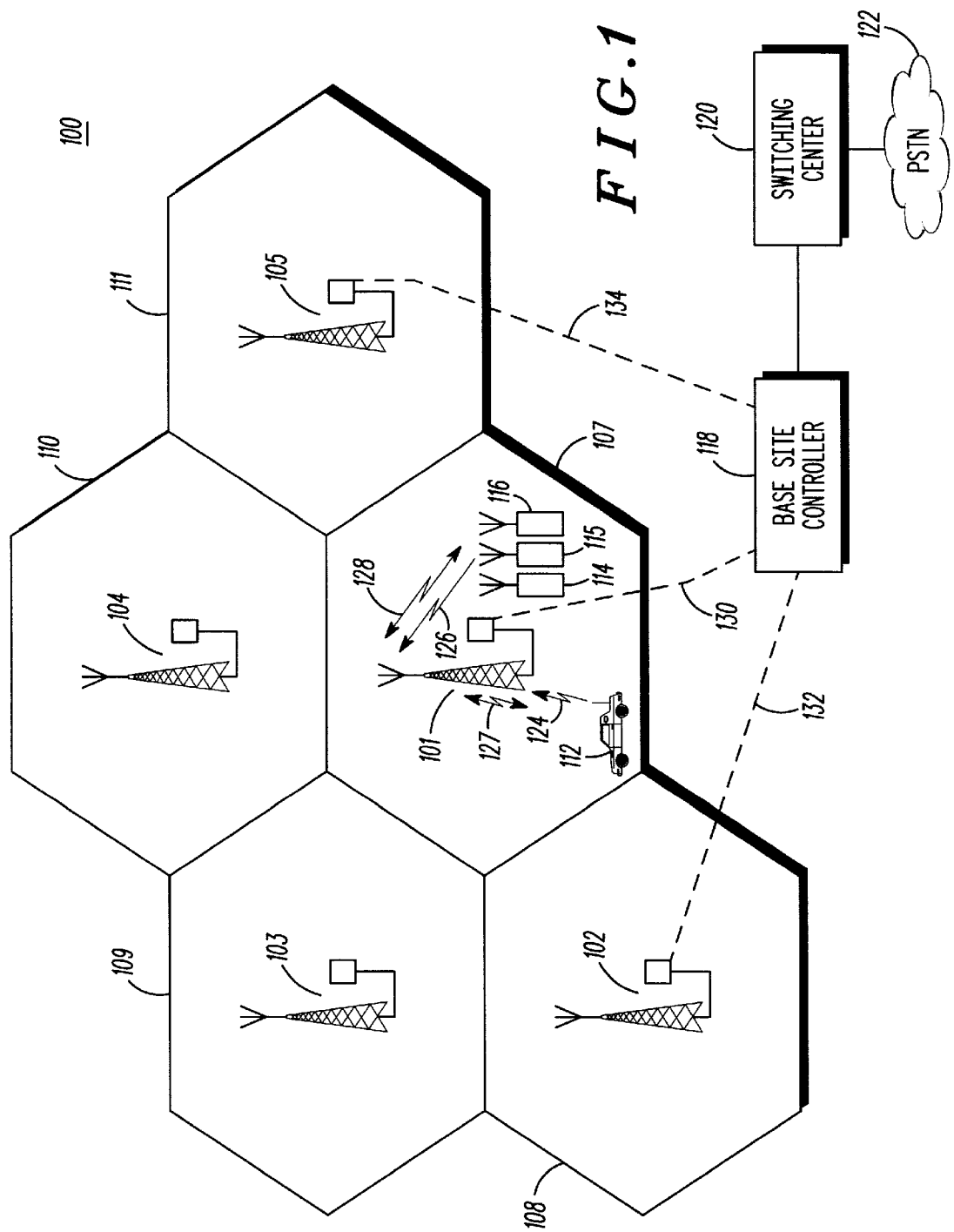
FIG. 1 illustrates a communication system in accordance with the invention.
Figure 2:
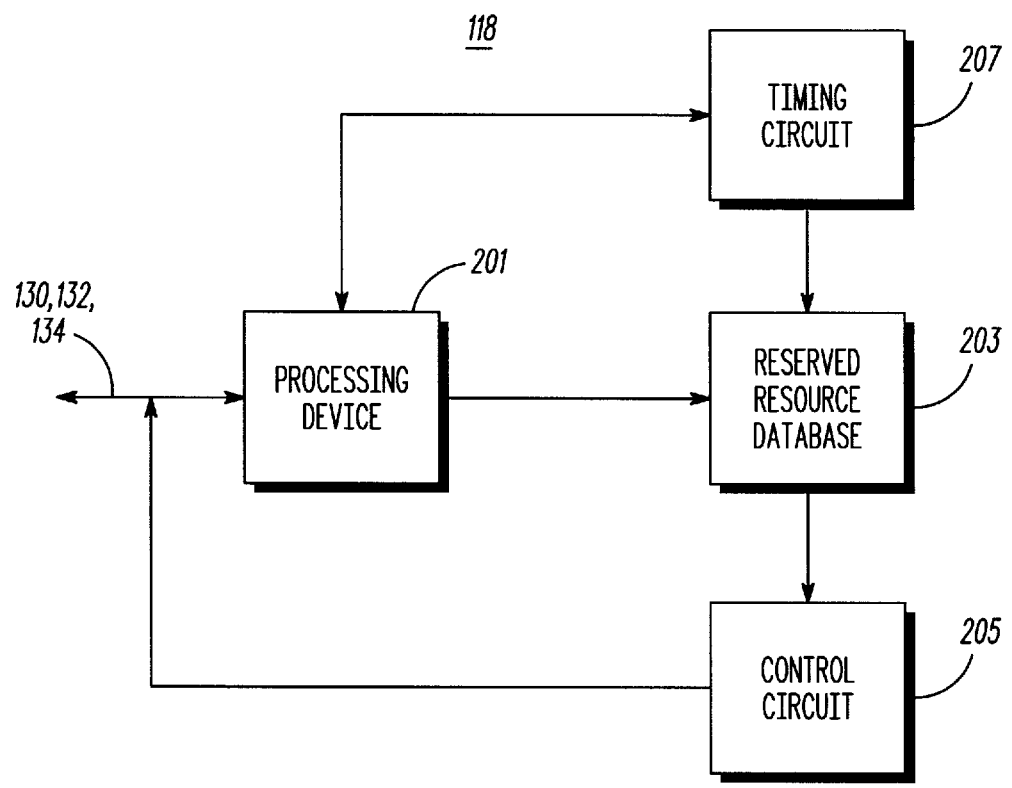
FIG. 2 illustrates a block diagram of a base site controller in accordance with the present invention.

The present invention can be more fully understood with reference to FIGS. 1–3. FIG. 1 illustrates a communication system 100 in accordance with the present invention. The communication system 100 includes infrastructure equipment and a plurality of communication units 112, 114–116. The infrastructure equipment includes a plurality of base sites 101–105 serving a plurality of corresponding service coverage areas 107–111 and a base site controller (BSC) 118. In a preferred embodiment, the communication system 100 comprises an analog or digital cellular communication system, such as the Advanced Mobile Phone Service (AMPS) system, the Narrowband AMPS system (NAMPS), the Total Access Communications System (TACS), the Global System for Mobile Communications (GSM), the Personal Communication System (PCS), the Personal Digital Cellular (PDC) system, the United States Digital Cellular (USDC) system described in Electronic Industries Association/Telecommunications Industry Association Interim Standard 54 (EIA/TIA IS-54), or the code division multiple access (CDMA) system described in EIA/TIA IS-95. However, in an alternate embodiment, the communication system 100 might comprise a trunked two-way communication system with telephone interconnect capability.

The communication units 112, 114–116 preferably comprise mobile or portable radiotelephones. As shown, communication unit 112 comprises a mobile radiotelephone; whereas, communication units 114–116 comprise a group of portable radiotelephones. However, in an alternate embodiment in which the communication system 100 comprises a wireless local loop PCS, the communication units 112, 114–116 might comprise fixed subscriber stations located within residential houses. A preferred embodiment of the BSC 118 is described below with reference to FIG. 2. As shown in FIG. 1, the BSC 118 is preferably coupled to a switching center 120 to provide the communication units 112, 114–116 access to the public switched telephone network (PSTN, 122). In a preferred embodiment, the BSC 118 resides external to the base sites 101–105 and controls multiple base sites (e.g., 101, 102, 105). However, in an alternate embodiment, a BSC 118 might reside at one or more of the base sites 101–105 and correspondingly control one or more of the base sites 101–105 depending on a particular system architecture.

Operation of the communication system 100 in accordance with the present invention occurs as follows. When a communication unit 112 desires to initiate a priority call, the communication unit 112 transmits a system access request 124 to the base site 101 within whose service coverage area 107 the communication unit 112 currently resides. The base site 101 transfers the system access request 124 to the BSC 118 via link 130. Likewise, when the other base sites 102–105 receive system access requests, the base sites 102–105 forward the requests to the BSC 118 via associated links (e.g., 132, 134). The BSC then automatically determines whether the system access request 124 is a request to initiate a priority call. For example, the communication unit 112 might desire to place an emergency call, such as a 911 call, a call to a poison control center, or an emergency call to a fire or police department. The BSC 118 makes this determination by preferably examining the dialed digits contained in the system access request 124. For example, the dialed digits may include an established priority destination phone number (e.g., 911) or a predetermined feature code entered by the communication unites user prior to transmission of the system access request 126 that identifies the call as a priority call.

When the BSC 118 determines that the communication unit 112 desires to initiate a priority call, the BSC 118 preferably enters an operational state in which the BSC 118 reserves one or more communication resources at the base site 101 to maintain a pool of reserved communication resources to support the priority call of the communication unit 112 and any other priority calls. In a preferred embodiment, the pool of reserved communication resources is maintained by reserving one or more communication resources either immediately or as they become available. In addition, the BSC 118 might reserve communication resources at alternate base sites (e.g., 102–105) in anticipation of, for example, the communication unit 112 moving before its next attempt to access the communication system 100 or in anticipation of a handoff of the communication unit 112 to one of the other base sites 102–105. Thus, in accordance with the preferred embodiment, the BSC 118 reserves communication resources as they become available at at least the serving base site 101 in anticipation of the communication unit's initiation of the priority call. Depending on the particular type of communication system 100, the communication resources might comprise uplink (communication unit-to-base site) and downlink (base site-to-communication unit) frequency pairs, as in a frequency division multiple access (FDMA) system such as AMPS, combined uplink and downlink frequency/time slot pairs, as in a time division multiple access (TDMA) system such as GSM, or pseudo-noise codes, as in a CDMA system such as IS-95.

The BSC 118 then ascertains whether a communication resource is available at the base site 101 to support the priority call upon its initiation. If a communication resource is available when the BSC 118 receives the system access request 124, the BSC 118 instructs the base site 101 to allocate the communication resource 127 to the communication unit 112 in accordance with well-known call set-up techniques. However, if a communication resource is not presently available, the BSC 118 instructs the base site 101 to transmit a signal to the communication unit 112 (e.g., an order for the communication unit 112 to provide a fast busy to the user) informing the communication unit 112 that no communication resources are presently available at the base site 101. Upon the communication unit's subsequent initiation of a priority call, the serving base site 101 allocates a reserved communication resource 127, provided a communication resource has been reserved, to the communication unit 112 to support the priority call. In addition, since the BSC 118 is in a reservation state, the BSC 118 proceeds to reserve at least another communication resource at the serving base site 101 as it becomes available to replace the reserved communication resource 127 previously allocated. For example, while in the reservation state, the BSC 118 might reserve one communication resource upon determining that the communication unit 112 desires to initiate a 911 call. Therefore, once the base site 101 allocates the reserved communication resource 127 to the communication unit 112, the BSC 118 preferably reserves another communication resource, when available, to maintain at least one reserved communication resource at the serving base site 101 in anticipation of another priority call (e.g., a return call to the communication unit 112). In an alternate embodiment, the BSC 118, instead of reserving another communication resource after allocation of the reserved communication resource 127, might retain communication resource 127 as the reserved communication resource once it becomes available (i.e., after termination of the priority call presently supported by communication resource 127).

During the communication unit's priority call the serving base site 101 monitors signal quality of the priority call and forwards the signal quality information to the BSC 118. When the signal quality degrades below a desired threshold, the BSC informs target base sites (e.g., 102–105) of the potential for a handoff of the priority call and, if it has not done so already, instructs the target base sites 102–105 to reserve at least one communication resource to support the priority call. When the BSC 118 determines that the handoff is required, the BSC 118 instructs the selected target base site (e.g., 102) to allocate a reserved communication resource to the communication unit 112 to execute the handoff of the priority call from the serving base site 101 to the target base site 102. Once the target base site 102 begins supporting the communication unit's priority call, the BSC 118 enters an operational state, similar to that described above with regard to the serving base site 101, in which the BSC 118 continuously reserves one or more communication resources as they become available at the target base site 102.

While the communication unit 112 is being supported by the serving base site 101, the BSC 118 remains in the operational state of reserving communication resources at the serving base site 101. However, when the communication unit's priority call terminates at the serving site 101 (e.g., due to call termination or handoff), the BSC 118 determines whether a subsequent priority call is expected at the serving base site 101. In a preferred embodiment, this determination is accomplished by determining the length of time elapsed from the termination of the communication unit's priority call at the serving base site 101 until a threshold time (e.g., 15 minutes). When the length of time from the termination of the communication unit's priority call exceeds the threshold time, the BSC 118 exits the reservation state with regard to the serving base site 101 and returns any reserved communication resources at the serving base site 101 to the pool of common communication resources available to all the communication units (e.g., 112, 114–116).

When a group of communication units 114–116 desire to initiate a plurality of priority calls, at least one (e.g., 115) of the communication units 114–116 transmits a system access request 126 to the base site 101 within whose service coverage area 107 the communication units 114–116 currently reside The base site 101 transfers the system access request 126 to the BSC 118 via link 130. The BSC 118 then automatically determines whether the system access request 126 is a request to initiate a group of priority calls. In a preferred embodiment, the BSC 118 determines that a group of priority calls are forthcoming by receiving a predetermined feature code (i.e., a particular set of dialed digits) within the system access request 126. In an alternate embodiment, the BSC 118 might examine an identification number of the communication unit 115 to determine if the identification number corresponds to one of a group of identification numbers that are allowed priority access to the system 100.

When the BSC 118 determines that the group of communication units 114–116 desire to initiate priority calls, the BSC 118 enters an operational state, similar to that described above, in which the BSC 118 reserves one or more communication resources at the base site 101 as they become available to maintain a pool of reserved communication resources to support priority calls placed by the group of communication units 114–116. Upon the initiation of a priority call-which may be either simultaneous with or subsequent to the system access request 126—by one (e.g., 115) of the group of communication units 114–116, the serving base site 101 allocates a reserved communication resource 128 to the communication unit 115 to support the priority call. In addition, since the BSC 118 is in a reservation state, the BSC 118 proceeds to reserve at least another communication resource at the serving base site 101 as it becomes available to maintain a predetermined number of reserved communication resources at the serving base site 101 to support the group's priority calls. For example, when a group of three communication units 114–116, as shown in FIG. 1, desires to place priority calls, the BSC 118 might maintain three communication resources available at the serving base site 101 for the anticipated priority calls.

While the group of communication units 114–116 are being supported by the serving base site 101, the BSC 118 remains in the operational state of reserving communication resources at the serving base site 101. However, when the last priority call placed by the group of communication units 114–116 terminates, the BSC 118 determines whether a subsequent priority call from the group is expected at the serving base site 101. In this case, the determination is accomplished by determining the length of time elapsed from the termination of the last priority call until a threshold time. When the length of time from the termination of the last priority call exceeds the threshold time, the BSC 118 exits the reservation state with regard to the serving base site 101 and returns any reserved communication resources at the serving base site 101 to the pool of common communication resources available to all other communication units.

As described above, the present invention provides a technique for implementing channel reservation for priority calls on an as-needed basis, without requiring human intervention as in the prior art. The present invention automatically determines when a priority call is placed; whereas, prior art approaches, such as continuous channel reservation activated by the system operator at system start-up or intermittent channel reservation activated by the system operator in response to a request by a system user, require human intervention by the system operator and the channel reservation user (e.g., via a separate phone call to the system operator). In addition, the present invention provides for automatic de-activation of channel reservation when another priority call is not expected. By contrast, as with prior art activation of channel reservation, prior art de-activation of channel reservation also requires human intervention.

FIG. 2 illustrates a block diagram of the BSC 118 of FIG. 1 in accordance with a preferred embodiment of the present invention. The BSC 118 includes, inter alia, a processing device 201, a reserved resource database 203, a control circuit 205, and a timing circuit 207. The processing device 201 preferably comprises a microprocessor and the reserved resource database 203 preferably comprises a random access memory (RAM). The control circuit 205 is preferably implemented as a software algorithm. However, in the alternative, the control circuit 205 may comprise digital logic circuitry. In the preferred embodiment, the timing circuit 207 is incorporated in the processing device 201, although the timing circuit 207 might alternatively be implemented as a separate, known general purpose timer.

When the BSC 118 receives a system access request (e.g., via link 130, 132, or 134) from a base site, the request is analyzed by the processing device 201 to determine whether the request is for a priority call. The analysis performed by the processing device 201 preferably comprises either comparing a destination phone number contained in the request to a list of so-called emergency phone numbers or comparing a feature code contained in the request to a list of feature codes associated with priority call users. Thus, in the preferred embodiment, the processing device 201 serves as a means for automatically determining that a communication unit desires to initiate a priority call.

When the processing device 201 determines that a communication unit desires to place a priority call, the processing device 201 instructs the reserved resource database 203 to reserve a predetermined number of communication resources to support future priority calls at the base site serving the communication unit. The reserved resource database 203 removes the predetermined number of communication resources, as they become available, from the pool of common resources available to all communication units and places the reserved resources in a reserved list for use only by those communication units that desire to initiate priority calls. Thus, in the preferred embodiment, the reserved resource database 203 comprises a means for reserving communication resources at the base site to support priority calls, including the priority call of the communication unit currently requesting system access.

Upon initiation of the priority call by the communication unit, the control circuit 205 selects one of the reserved communication resources from the reserved resource database 203 and instructs the serving base site, via the appropriate link 130, 132, 134, to allocate the selected, reserved communication resource to the requesting communication unit. Once the serving base site allocates the reserved communication resource to the communication unit, the processing device 201 instructs the reserved resource database 203 to reserve another communication resource to replace the communication resource just allocated by the base site.

In the preferred embodiment, upon termination of the priority call by the communication unit, the serving base site informs the processing device 201 of the call termination and the processing device 201 actuates the timing circuit 207. The timing circuit 207 determines the length of time from the termination of the priority call. When the length of time exceeds a predetermined threshold without the initiation of another priority call, the processing device 201 presumes that a subsequent priority call is not expected and instructs the reserved resource database 203 to return any reserved communication resources to the general pool of common resources available to any requesting communication unit. However, if another priority call is initiated before the timing circuit 207 reaches the predetermined threshold, the processing device 201 resets the timing circuit 207 and the above process continues until another priority call is not expected (i.e., the threshold time is exceeded).

FIG. 3 illustrates a logic flow diagram 300 of steps executed by a base site controller and a base site in accordance with a preferred embodiment of the present invention. The logic flow begins (301) when the BSC determines (303) automatically that a communication unit desires to initiate a priority call. The determination is automatic because, unlike prior art channel reservation, no human intervention is required to inform the BSC of potential priority calls. As discussed above with regard to FIG. 1, the BSC preferably identifies either a predetermined feature code or a destination phone number contained in the transmitted system access request to distinguish a call as a priority call. In an alternate embodiment, the BSC might determine automatically that a communication unit desires to initiate a priority call by receiving a request to reserve a communication resource from another BSC serving the communication unit in anticipation of a handoff.

When the BSC determines automatically that a communication unit desires to place a priority call, the BSC determines (305) whether a communication resource is available at the serving base site. The BSC might check resource availability at base sites other than the communication unit's serving base site when the BSC anticipates that the communication unit, or other communication units, might initiate priority calls from coverage areas of the other base rites. For example, the BSC could be programmed to check resource availability at several base sites whenever the BSC determines that an ambulance driver has placed an emergency call. When the BSC determines that a communication resource is not available at at least the serving base site, the BSC preferably continues (305) to monitor for available resources. However, in an alternate embodiment, when a communication resource is not available, the BSC might place the communication unit in a priority queue for allocation of the next available communication resource.

When the BSC determines that a communication resource is available at either the serving base site or the other checked base sites, the BSC reserves (307) a communication resource for the communication unit at the serving base site and any other base sites, as necessary. In the case where the BSC has determined that a group of communication units desire to initiate priority calls—for example, due to the reception of a particular feature code at the BSC—the BSC reserves multiple communication resources as they become available to support the plurality of anticipated priority calls.

Once the BSC has reserved the communication resource or resources, as the particular situation dictates, the serving base site allocates (309) a reserved communication resource to the communication unit upon initiation of the priority call. In addition, the BSC reserves (309) an additional communication resource at the serving base site, when the additional resource is available, to replace the allocated resource and thereby maintain at least one reserved resource for a subsequent priority call. In cases where communication resources are available immediately upon the BSC's determination (303) that the communication unit desires to place a priority call, the allocation of the communication resource occurs virtually simultaneous to the communication resource reservation (307) by the BSC. Thus, in these cases, priority call reservation/allocation is similar to obtaining an available resource, or channel, when placing a normal cellular phone call. However, in cases where communication resources are not initially available, the BSC recognizes (303) the communication unit's desire to place a priority call and reserves (307) a communication resource in anticipation of the communication unit's subsequent attempt to place the priority call. In the latter cases, the serving base site allocates (307) the reserved communication resource to the communication unit upon identifying its subsequent attempt to place the priority call.

Once the serving base site has allocated the reserved communication resource to the communication unit, the serving base site monitors (311) signal quality of the priority call received from the communication unit. When the signal quality degrades below a threshold, or when the signal quality begins degrading at an undesired rate, the serving base site informs the BSC of the signal quality condition and the BSC, if it has not done so already, reserves (313) at least one communication resource at a target base site in anticipation of the handoff of the priority call. As the signal quality degrades, the BSC determines (315) whether a handoff of the priority call is necessary. A handoff is necessary, for example, when the signal quality—as determined via a received signal strength measurement or a bit error rate (BER) determination—degrades below a threshold coinciding with a desired received speech quality. In a typical cellular communication system, such as GSM, the handoff threshold is a BER of approximately 7%. In the preferred embodiment, when a handoff is not necessary, the BSC determines (323) whether another priority call is expected, as later described. However, in an alternate embodiment, the BSC might reserve the communication resource or resources for a predetermined length of time at the target base site and, if the serving base site determines that a handoff is not necessary, the BSC will return the reserved communication resources at the target base site to the pool of common communication resources available to other communication units being serviced by the target base site.

When the BSC determines that a handoff of the priority call is necessary, the BSC notifies (317) the target base site of the upcoming handoff and the target base site allocates (319) a reserved communication resource to the communication unit. In addition, the BSC reserves (309) an additional communication resource at the target base site, when the additional resource is available, to replace the allocated resource and thereby maintain at least one reserved resource for a subsequent priority call. The BSC then directs the serving base site to handoff (321) the communication unit from the reserved communication resource at the serving base site to the reserved communication resource at the target base site in accordance with known handoff techniques.

When the signal quality is not degrading, or when a handoff is either completed or not necessary, the BSC determines (323) whether a subsequent priority call is expected. In the preferred embodiment, the BSC determines whether another priority call is expected by determining a length of time from a termination of the priority call, or a termination of any ongoing priority calls when multiple communication units are placing priority calls. When the length of time exceeds a threshold (e.g., 15 minutes) without the initiation of another priority call, the BSC determines (323) that another priority call is not expected. However, if another priority call occurs within the threshold time, a subsequent priority call is expected and the logic flow resumes at allocation block 309. In an alternate embodiment, the BSC might determine whether a subsequent priority call is expected by determining a length of time from an initiation of the last priority call. In this embodiment, when another priority call has not been initiated prior to the length of time exceeding a threshold, the BSC determines that a subsequent priority call is not expected. In yet another embodiment, the BSC might determine whether a subsequent priority call is expected by determining whether another priority call is initiated within a predetermined time from the initiation of the first priority call. In still a further embodiment, the BSC might determine whether a subsequent priority call is expected by determining whether another priority call is initiated within a predetermined time from the determination (303) of the communication unit's desire to initiate the first priority call.

When a subsequent priority call is not expected, the BSC returns (325) any reserved communication resources to the pool of common communication resources available to all communication units and the logic flow ends (327).

The present invention encompasses a method and apparatus for allocating communication resources to support priority communications by communication units in a communication system. With this invention, channel reservation and queuing can be implemented in a communication system to support priority calls without the need for human intervention or continuous channel reservation. The present invention provides for efficient use of a system's assigned frequency spectrum by allowing channel reservation to occur on an as-needed basis, but without the need for a separate call to the system operator requesting the activation of channel reservation. In addition, the present invention provides expedited channel availability to communication units in systems that utilize queuing by allocating reserved resources to those communication units that might otherwise be queued, and requiring communication units to be queued only if no channels are reserved.

While the present invention has been particularly shown and described with reference to particular embodiments thereof, it will be understood by those skilled in the art that various changes in form and details may be made therein without departing from the spirit and scope of the present invention.

What we claim is:

1. In a communication system that includes a plurality of base sites and a plurality of mobile communication units, a method for allocating a common communication resource of a plurality of common communication resources, the plurality of common communication resources available to the plurality of mobile communication units, to support a priority private voice communication by a mobile communication unit, the method comprising the steps of:

a) automatically determining that a first mobile communication unit desires to initiate a first priority private voice communication;

b) in response to the determination, reserving a first common communication resource of the plurality of common communication resources at a first base site to produce a first reserved communication resource;

c) allocating the first reserved communication resource to the first mobile communication unit upon initiation of the first priority private voice communication;

d) upon termination of the first priority private voice communication, continuing to reserve the first common communication resource at the first base site for a predetermined period of time, the predetermined period of time sufficient for the first reserved communication resource to be allocated, via a channel assignment operation, to a second mobile communication unit upon determining that the second mobile communication unit desires to initiate a second priority private voice communication; and e) after the predetermined period of time, returning the first reserved communication resource to the plurality of common communication resources available to the plurality of mobile communication units.

2. The method of claim 1, further comprising the steps of:

d) determining whether a subsequent priority call is expected; and e) returning, when a subsequent priority call is not expected, any reserved communication resources to the plurality of common communication resources at the first base site, such that any previously reserved communication resources are available to the plurality of communication units.

3. The method of claim 2, wherein step (d) comprises the steps of:

d1) determining a length of time from a last priority call initiation; and d2) determining that a subsequent priority call is not expected when the length of time exceeds a threshold.

4. The method of claim 2, wherein step (d) comprises the steps of:

d1) determining a length of time from a termination of ongoing priority calls; and d2) determining that a subsequent priority call is not expected when the length of time exceeds a threshold.

5. The method of claim 2, wherein step (a) further comprises the step of, upon determining that the communication unit desires to initiate the priority call, entering an operational state within which at least one common communication resource is reserved in anticipation of at least the priority call.

6. The method of claim 1, wherein step (a) comprises the step of determining that the communication unit desires to initiate an emergency call.

7. The method of claim 1, wherein step (b) comprises the steps of:
   b1) determining whether a common communication resource is available at the first base site; and
   b2) reserving the common communication resource for the communication unit when the common communication resource is available to produce the first reserved communication resource.

8. The method of claim 7, wherein step (b1) further comprises the step of placing the communication unit in a priority queue for allocation of a next available common communication resource when a common communication resource is not available at the first base site.

9. The method of claim 1, wherein step (a) comprises the step of determining that a group of communication units desire to initiate a plurality of priority calls.

10. The method of claim 9, wherein step (a) comprises the step of determining that the group of communication units desire to initiate the plurality of priority calls based on receipt of a predetermined code transmitted by at least one communication unit of the group.

11. The method of claim 9, wherein step (b) comprises the step of reserving at least two of the plurality of common communication resources for the group of communication units to produce a plurality of reserved communication resources.

12. The method of claim 1, wherein step (b) further comprises the step of:
   b1) reserving a second common communication resource for the communication unit at a second base site of the infrastructure equipment to produce a second reserved communication resource.

13. The method of claim 12, wherein step (b1) comprises the steps of:
   b1a) reserving the second common communication resource at the second base site for a predetermined length of time to produce the second reserved communication resource; and
   b1b) returning the second reserved communication resource to the plurality of common communication resources at the second base site upon expiration of the predetermined length of time, such that the second reserved communication resource is available to the plurality of communication units.

14. The method of claim 12, wherein step (c) further comprises the step of allocating the second reserved communication resource to the communication unit.

15. The method of claim 12, wherein step (c) further comprises the steps of:
   c1) determining that a handoff of the priority call is required;
   c2) notifying the second base site of the handoff;
   c3) allocating the second reserved communication resource to the communication unit; and
   c4) handing off the priority call from the first reserved communication resource at the first base site to the second reserved communication resource at the second base site.

16. In a communication system that includes infrastructure equipment and a plurality of communication units, a method for the infrastructure equipment to allocate at least some of a plurality of common communication resources to support priority private voice communications by at least some of the plurality of communication units, the method comprising the steps of:
   a) receiving a predetermined code transmitted by a first communication unit of a group of communication units that desire to initiate a plurality of priority private voice calls;
   b) reserving a predetermined number of the plurality of common communication resources at a first base site of the infrastructure equipment to produce a plurality of reserved communication resources;
   c) allocating a reserved communication resource of the plurality of reserved communication resources to a first communication unit of the group of communication units upon initiation of a first priority private voice call of the plurality of priority private voice calls;
   d) upon termination of the first priority private voice call, continuing to reserve the reserved communication resource at the first base site for a predetermined period of time, the predetermined period of time sufficient for the reserved communication resource to be allocated, via a channel assignment operation, to a second communication unit upon determining that the second communication unit desires to initiate a second priority private voice call; and
   e) after the predetermined period of time, returning the plurality of reserved communication resources to the plurality of common communication resources, the plurality of reserved communication resources being available to the plurality of communication units.

17. The method of claim 16, wherein step (d) comprises the steps of:
   d1) determining a length of time from a termination of ongoing priority calls; and
   d2) determining that a subsequent priority call is not expected when the length of time exceeds a threshold.

18. In a communication system that includes a base site controller and a plurality of base sites, the plurality of base sites being assigned a plurality of communication resources to provide communication services to a plurality of communication units, the base site controller reserving at least some of the plurality of communication resources to support priority private voice communications by at least some of the plurality of communication units, the base site controller comprising:
   a processing device, coupled to a first base site of the plurality of base sites, that automatically determines when a first communication unit of the plurality of communication units desires to initiate a priority private voice call;
   a reserved resource database, coupled to the processing device, that reserves a communication resource of the plurality of communication resources at the first base site to facilitate the priority private voice call when the communication resource is available to produce a reserved communication resource;
   a control circuit, coupled to the reserved resource database and the first base site, that directs the first base site to allocate the reserved communication unit to the first communication unit; and a timing circuit, coupled to the processing device and the reserved resource database, that determines a length of time from a termination of the priority private voice call and directs the reserved resource database to return the reserved communication resource to the plurality of communication resources when the length of time exceeds a predetermined threshold, the predetermined threshold sufficient for the reserved communication resource to be allocated, via a channel assignment operation, to a second communication unit upon determining that the second communication unit desires to initiate a second priority private voice call.

* * * * *